(12) United States Patent
Li et al.

(10) Patent No.: US 10,781,557 B2
(45) Date of Patent: Sep. 22, 2020

(54) DURABLE RAILWAY TIE

(71) Applicant: THE REGENTS OF THE UNIVERSITY OF MICHIGAN, Ann Arbor, MI (US)

(72) Inventors: Victor C. Li, Ann Arbor, MI (US); Emily Herbert, Williamston, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 324 days.

(21) Appl. No.: 15/550,304

(22) PCT Filed: Feb. 10, 2016

(86) PCT No.: PCT/US2016/017286
§ 371 (c)(1),
(2) Date: Aug. 10, 2017

(87) PCT Pub. No.: WO2016/130637
PCT Pub. Date: Aug. 18, 2016

(65) Prior Publication Data
US 2018/0016752 A1    Jan. 18, 2018

Related U.S. Application Data

(60) Provisional application No. 62/114,712, filed on Feb. 11, 2015.

(51) Int. Cl.
*E01B 3/28* (2006.01)
*C04B 40/06* (2006.01)
(Continued)

(52) U.S. Cl.
CPC ............. *E01B 3/28* (2013.01); *C04B 14/06* (2013.01); *C04B 16/06* (2013.01); *C04B 18/146* (2013.01);
(Continued)

(58) Field of Classification Search
CPC .............. E01B 3/28; E01B 3/36; E01B 3/32
See application file for complete search history.

(56) References Cited

U.S. PATENT DOCUMENTS 4,265,400 A * 5/1981 Jordon .................... B61L 1/184
174/98
5,788,760 A    8/1998 Li et al.
(Continued)

FOREIGN PATENT DOCUMENTS

CN    101094957 A    12/2007
CN    103265259 A    8/2013
(Continued)

OTHER PUBLICATIONS

Huang, Xiaoyan et al., "On the Use of Recycled Tire Rubber to Develop Low E-Modulus ECC for Durable Concrete Repairs," Construction and Building Materials, vol. 46 (2013) pp. 134-141.
(Continued)

*Primary Examiner* — Zachary L Kuhfuss
(74) *Attorney, Agent, or Firm* — Harness, Dickey & Pierce, P.L.C.

(57) ABSTRACT

A railway tie being constructed of an engineered cementitious composite (ECC) material having: (1) a minimum of 2% tensile ductility of ECC, (2) complete absence of alkali-silica reaction (ASR), (3) high fatigue resistance of ECC at least five times that of normal concrete, (4) self-healing ability of ECC requiring only water and air, and (5) customization of ECC for lower stiffness in the tie (60% that of normal concrete) and higher abrasion resistance in the seat (three times that of normal concrete).

9 Claims, 1 Drawing Sheet

(51) Int. Cl.
- C04B 14/06 (2006.01)
- C04B 16/06 (2006.01)
- C04B 18/14 (2006.01)
- C04B 28/04 (2006.01)
- E01B 3/32 (2006.01)
- C04B 103/32 (2006.01)
- C04B 103/44 (2006.01)

(52) U.S. Cl.
CPC .......... *C04B 28/04* (2013.01); *C04B 40/0675* (2013.01); *E01B 3/32* (2013.01); *C04B 2103/32* (2013.01); *C04B 2103/44* (2013.01); *C04B 2201/52* (2013.01); *Y02A 30/336* (2018.01); *Y02W 30/92* (2015.05); *Y02W 30/94* (2015.05); *Y02W 30/96* (2015.05)

(56) References Cited

U.S. PATENT DOCUMENTS

| | | | |
|---|---|---|---|
| 6,604,690 B2* | 8/2003 | Young | E01B 31/20 238/270 |
| 6,659,362 B1 | 12/2003 | Hallissy et al. | |
| 6,662,506 B2 | 12/2003 | Fischer et al. | |
| 6,694,690 B2 | 2/2004 | Li et al. | |
| 6,809,131 B2 | 10/2004 | Li et al. | |
| 6,969,423 B2 | 11/2005 | Li et al. | |
| 7,169,224 B2 | 1/2007 | Li et al. | |
| 7,241,338 B2 | 7/2007 | Li et al. | |
| 7,572,501 B2 | 8/2009 | Li et al. | |
| 7,799,127 B2 | 9/2010 | Li et al. | |
| 2008/0105757 A1 | 5/2008 | Freudenstein | |
| 2008/0179417 A1* | 7/2008 | Bayer | B29B 17/0042 238/84 |
| 2009/0035459 A1* | 2/2009 | Li | F16L 58/06 427/202 |
| 2009/0075076 A1* | 3/2009 | Li | C04B 28/04 428/359 |
| 2010/0012742 A1 | 1/2010 | Li | |
| 2013/0012625 A1* | 1/2013 | Li | C04B 28/04 524/8 |
| 2015/0330031 A1* | 11/2015 | Van Erp | B32B 7/02 238/115 |
| 2016/0002862 A1* | 1/2016 | Romero | E01B 3/34 238/84 |
| 2018/0016752 A1* | 1/2018 | Li | C04B 40/0675 |

FOREIGN PATENT DOCUMENTS

| | | |
|---|---|---|
| CN | 104193258 A | 12/2014 |
| DE | 102008037171 A1 | 2/2010 |
| JP | 2001-254302 A | 9/2001 |
| JP | 2003-082601 A | 3/2003 |
| JP | 2008-527201 A | 7/2008 |
| JP | 2011-017150 A | 1/2011 |

OTHER PUBLICATIONS

Herbert, Emily N., et al., "Self-Healing of Engineered Cementitious Composites in the Natural Environment," In Proceedings of High Performance Fiber Reinforced Cement Composites 6, pp. 148-165 (2011), Ann Arbor, MI.

Herbert, Emily N., et al., "Self-Healing of Microcracks in Engineered Cementitious Composites (ECC) Under a Natural Environment," Materials, 6, pp. 2831-2845 (2013).

Kan, Li-Li, et al., "Self-Healing Characterization of Engineered Cementitious Composites (ECC)," ACI Materials Journal, 107 (6), pp. 617-624 (2010).

Kernes, Ryan G., et al., "Investigation of the Impact of Abrasion as a Concrete Crosstie Rail Seat Deterioration (RSD) Mechanism," In AREMA 2011 Annual Conference in Conjunction with Railway Interchange 2011.

Kernes, Ryan G., et al., "Investigation of the Dynamic Frictional Properties of a Concrete Crosstie Rail Seat and Pad and its Effect on Rail Seat Deterioration (RSD)," In Transportation Research Board 91st Annual Meeting, RAILTEC, University of Illinois at Urbana—Champaign (2011).

Kim, Yun Yong, et al., "Fatigue Response of Bridge Deck Link Slabs Designed with Ductile Engineered Cementitious composite (ECC)", in Proc., International Conference on Concrete under Severe Conditions—Environment & Loading (CONSEC '04), Seoul, Jun., pp. 832-841 (2004).

Lepech, Michael D., et al., "Design of Green Engineered Cementitious Composites for Improved Sustainability," ACI Materials Journal (Nov.-Dec. 2008) pp. 567-575.

Lepech, Michael, et al., "Durability and Long Term Performance of Engineered Cementitious Composites," In Proceedings of International RILEM workshop on HPFRCC in structural applications (2006), pp. 165-174, Honolulu, HI.

Li, Victor C., et al., "From Micromechanics to Structural Engineering—The Design of Cementitious Composites for Civil Engineering Applications," Japan Society of Civil Engineers, Journal of Structural Mechanics and Earthquake Engineering, vol. 10, No. 2, 37s-48s (Jul. 1993).

Li, Victor C., "On Engineered Cementitious Composites (ECC): A Review of the Material and Its Applications," Journal of Advanced Concrete Technology, vol. 1, No. 3, pp. 215-230 (Nov. 2003).

Li, Victor C., "Robust Self-Healing Concrete for Sustainable Infrastructure," Journal of Advanced Concrete Technology, vol. 10 (2012) pp. 207-218.

Li, Mo, et al. "Cracking and Healing of Engineered Cementitious Composites Under Chloride Environment," ACI Materials Journal, 108-M36 (May-Jun. 2011), pp. 333-340.

Li, Mo et al. "Rheology, Fiber Dispersion, and Robust Properties of Engineered Cementitious Composites," Materials and Structures, 46 (3) (2013) pp. 405-420.

Li, Victor C., "Integrated Structures and Materials Design" RILEM, Journal of Materials and Structures, vol. 40 (4), (2007) pp. 387-396.

Li, Victor C., et al., "Tensile Strain-Hardening Behavior of Polyvinyl Alcohol Engineered Cementitious Composite (PVA-ECC)," ACI Materials Journal, 98-M52 (2001), pp. 483-492.

Meda, Alberto, et al., "Shear Strengthening of Reinforced Concrete Beam with High-Performance Fiber-Reinforced Cementitious Composite Jacketing," ACI Structural Journal, No. 111-S89 (2014) pp. 1059-1068.

Ranade, Ravi, et al., "Composite Properties of High-Strength, High-Ductility Concrete," ACI Materials Journal, No. 110-M37 (Jul.-Aug. 2013) pp. 413-422.

Kernes, Ryan G., et al., "Investigation of the Mechanics of Rail Seat Deterioration and Methods to Improve the Abrasion Resistance of Concrete Sleeper Rail Seats," Journal of Rail and Rapid Transit, vol. 228 (6) (2014) pp. 581-589.

Sahmaran, Mustafa, et al., "Durability of Mechanically Loaded Engineered Cementitious Composites Under Highly Alkaline Enviroments," Cement and Concrete Composites, vol. 30 (2008) pp. 72-81.

Sakulich, Aaron Richard, et al., "Microanalysis of Autogenous Healing Products in Engineered Cementitious Composites (ECC)," Microscopy Microanalysis, vol. 16 (Suppl. 2) (2010), pp. 1220-1221.

Wang, S. et al. "Lightweight Engineered Cementitious Composites (ECC)," In Proceedings of High Performance Fiber Reinforced Cement Composites 4 (2003), pp. 379-390, Ann Arbor, MI.

Soltan, Daniel G., et al., "Introducing a Curauá Fiber Reinforced Cement-Based Composite with Strain-Hardening Behavior," Industrial Crops and Products, vol. 103 (2017), pp. 1-12.

Wang, Shuxin, et al., "High-Early-Strength Engineered Cementitious Composites," ACI Materials Journal, vol. 103, No. 2 (Mar.-Apr. 2006), pp. 97-105.

Wang, Shuxin, et al., "Engineered Cementitious Composites with High-Volume Fly Ash," ACI Materials Journal, vol. 104, No. 3 (May-Jun. 2007), pp. 233-241.

Won, Jong-Pil, et al., "High Strength Polymer-Modified Repair Cementitious Composite for Fire Protection," Polymers & Polymer Composites, vol. 15, No. 5 (2007), pp. 379-388.

(56) References Cited

OTHER PUBLICATIONS

Zeman, John C., et al., "Moisture-Driven Deterioration and Abrasion of Concrete Sleeper Rail Seats," In Proceeding of the 9th World Congress on Railway Research (Feb. 1, 2011).

Yamamoto, Asami, et al., "Effect of Wet-Dry Condition on Self-Healing Property of Early-Age ECC," Japan Concretz Institute, vol. 32, No. 1 (2010), pp. 251-256.

Yang, En-Hua, et al., "Tailoring Engineered Cementitious Composites for Impact Resistance," Cement and Concrete Research, vol. 42 (2012), pp. 1066-1071.

Yang, Yingzi, et al., "Autogenous Healing of Engineered Cementitious Composites Under Wet-Dry Cycles," Cement and Concrete Research, vol. 39 (2009), pp. 382-390.

Zhang, Jun, et al., "Monotonic and Fatigue Performance in Bending of Fiber-Reinforced Engineered Cementitious composite in Overlay System," Cement and Concrete Research, vol. 32 (2002), pp. 415-423.

International Search Report and Written Opinion of the International Searching Authority issued in PCT/US2016/017286, dated May 4, 2016; ISA/KR.

Sahmaran M et al: "Internal Curing of Engineered Cementitious Composites for Prevention of Early Age Autogenous Shrinkage Cracking," Cement and Concrete Research, Pergamon Press, Elmsford, NY, US, vol. 39, No. 10, Oct. 1, 2009, pp. 893-901.

Mustafa Sahmaran et al: "Assessing the Durability of Engineered Cementitious Composites under Freezing and Thawing Cycles," ASTM International Journal, vol. 6, No. 7, Jan. 1, 2010, pp. 85-100.

Supplementary European Search Report issued in 16749778.3, dated Sep. 24, 2018.

Li, Victor C., Engineered Cementitious Composites (ECC), Chapter 1: Bendable Concrete for Sustainable and Resilient Infrastructure Introduction to Engineered Cementitious Composites (ECC) (2019) Springer Berlin Heidelberg (ISBN: 978-3-662-58438-5, DOI: 10.1007/978-3-662-58438-5_1).

First Office Action for Chinese Patent Application No. 201680015857.8 dated Nov. 2, 2018 with English language translation provided by Unitalen Attorneys at Law, 20 pages.

Mehta, P. Kumar et al., ConcreteL Microstructure, Properties, and Materials, China Electric Power Press, pp. 346-347 (Published Sep. 30, 2008); ISBN: 0-07-146289-9.

Third Office Action for Chinese Patent Application No. 201680015857.7 dated Jan. 19, 2020 with English language translation provided by Unitalen Attorneys at Law, 21 pages.

* cited by examiner

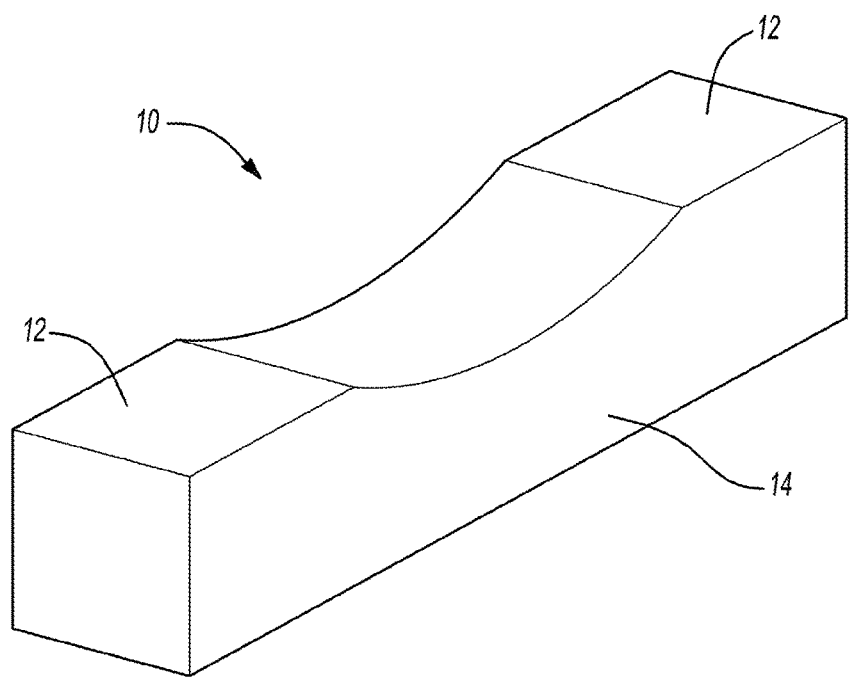

DURABLE RAILWAY TIE

CROSS-REFERENCE TO RELATED APPLICATIONS

This application is a U.S. National Phase Application under 35 U.S.C. 371 of International Application No. PCT/US2016/017286 filed on Feb. 10, 2016 and published in English as WO 2016/130637 A1 on Aug. 18, 2016. This application is based on and claims the benefit of priority from U.S. Provisional Application No. 62/114,712, filed on Feb. 11, 2015. The entire disclosures of all of the above applications are incorporated herein by reference.

FIELD

The present disclosure relates to railway ties and, more particularly, relates to railway ties being made of self-healing engineered cementitious composites.

BACKGROUND AND SUMMARY

This section provides background information related to the present disclosure which is not necessarily prior art. This section also provides a general summary of the disclosure, and is not a comprehensive disclosure of its full scope or all of its features.

Railroad ties are an integral part of railroad track infrastructure. They are typically embedded in rock ballast roadbeds and the rails sit on top of the ties. The spacing between ties is about 0.5 m, so there can be as many as 2000 ties per kilometer of track. Historically, railroad ties are made of timber. However, due to the limited durability of timber ties and the diminishing availability of hardwood with suitable quality, there has been a tendency towards shifting to concrete ties, either reinforced or prestressed with steel (i.e. internal reinforcement members).

Prestressed concrete railroad ties were first installed in North America in the early 1960s. Although the design life span of a concrete tie is considered to be approximately 50 years, premature failure of concrete ties since their inception has been extensively reported. For example, Amtrak installed 118,000 concrete ties in 1997 that lasted only 4 years before replacements were needed.

Premature failure of ties decreases track quality, resulting in frequent and costly maintenance for railroad companies and less reliable rail service for customers. In 2012, railroad companies in the United States invested a total of $22.4 billion to maintain and modernize rail networks. However, despite these heavy investments, the current state of railroad infrastructure in the United States was recently given a grade of C+ by the American Society of Civil Engineers, showing that further investments are needed in order to ensure railroads are in a state of good repair.

Premature failure of prestressed concrete railroad ties is caused by numerous factors. Harsh environmental conditions, such as freeze-thaw cycles, and chemical attack, including alkali silica reactions (ASR) and delayed ettringite formation, cause internal pressures that are large enough to induce concrete cracking. In addition, overloading and increasing speeds on railroad tracks cause rail seat deterioration that leads to abrasion and cracking of the concrete tie under the rail.

The severities of the above mentioned failure mechanisms are amplified by the brittle nature of concrete, which makes the ties prone to experience large crack widths. Cracking lowers the durability of a tie by creating pathways for harmful agents to penetrate the surface and corrode the prestressing steel, and reduces the resiliency by negatively impacting the mechanical properties of the tie. Repeated repairs and replacements make concrete railroad ties unsustainable due to the amount of wasted resources and energy. Therefore, the development of a railroad tie that can control damage and subsequently undergo self-repair will enable more durable, resilient, and sustainable railroad operation and service.

Current railroad ties are made with prestressed concrete. Over the last 10+ years, it has become clear that the durability of such ties is significantly below that expected, resulting in a need to repeated replacement and associated undesired downtime of the rail line. The lack of durability has been traced to two major mechanisms: (a) ASR and brittle spalling of concrete and subsequent corrosion of the prestressing steel, and (b) low abrasion resistance under the steel rail. The severity of poor deterioration has driven some rail company (including Amtrak) to consider returning to the use of the more traditional wood ties, despite its shortcomings (rotting and lack of quality wood). The unexpected short-service life of prestressed concrete ties is a global rail industry problem. While recognized for at least ten years, no solution has yet been found.

The present teachings provide a non-prestressed, engineered cementitious composite (ECC) concrete tie with structural stiffness tuned for riding stability. The present teachings exploit the tensile load carrying capability of ECC, so that prestressed steel can be partially or completely removed. The removal of steel has multiple benefits, including the obvious negation of any possibility of steel corrosion, the reduction in material and manufacturing cost, the reduction in tie production speed, and the reduction in stiffness of the railroad tie. This last enhancement—reduction of stiffness—is helpful to reduce the vibration caused by passing trains. Further benefits are achieved by tuning the ECC to a bending stiffness substantially lower than that of normal concrete. Tuning the ECC tie to have a stiffness similar to wood ties, for example, enables the replacement of only those wood ties that requires replacement, rather than a whole track section of ties. In some embodiments, implementation of the low stiffness rail-ECC is attained by deliberate use of rubber crumb particles. Finally, the present teachings employ a rail-seat made of high-strength, high-ductility ECC aimed at overcoming the problem of abrasion induced deterioration of the tie under the rail. In some embodiments, the tie is designed to last 100 years of active rail use.

To achieve the target performance of the present teachings, the following features of ECC are integrated into the new rail design: (1) a minimum of 2% tensile ductility of ECC, (2) complete absence of alkali-silica reaction (ASR), (3) high fatigue resistance of ECC at least five times that of normal concrete, (4) self-healing ability of ECC requiring only water and air, and (5) customization of ECC for lower stiffness in the tie (60% that of normal concrete) and higher abrasion resistance in the seat (three times that of normal concrete). These advantages offer value propositions including (1) reduced cost of railroad operation, (2) enhanced rail user satisfaction due to reduced downtime and smoother ride, and (3) enhanced rail safety.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a perspective view of a railway tie according to the principles of the present teachings.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

As described herein, railroad ties are an integral part of railroad track infrastructure. They are typically embedded in rock ballast roadbeds and the rails sit on top of the ties. The spacing between ties is about 0.5 m, so there can be as many as 2000 ties per kilometer of track. Historically, railroad ties are made of timber. However, due to the limited durability of timber ties and the diminishing availability of hardwood with suitable quality, there has been a tendency towards shifting to concrete ties, either reinforced or prestressed with steel.

Introduction

Railroad ties transfer loads as well as provide support for rail along railroad tracks. Current railroad ties are made with pre-stressed concrete. Impaired railroad tie durability has been observed over the last decade, which has led to repeated replacement and undesired downtime of the rail line. The lack of railroad tie durability has been linked to two primary mechanisms—Alkali-Silica Reaction (ASR) and brittle spalling of concrete, which can lead to corrosion of the pre-stressed steel components that are within the rail line as well as low abrasion resistance under the steel rail. While the deterioration and lack of durability of railroad ties has sparked concern and interest from major railroad companies, no solution has been found and it remains a global rail industry problem.

As illustrated in FIG. 1, the technology of the present teachings includes a non-prestressed ECC (Engineered Cementitious Composite) concrete tie 10 with structural stiffness tuned for riding stability. ECCs are a type of high-performance fiber-reinforced cementitious composites (HPFRCC) with significant strain-hardening behavior under tension. The technology leverages the tensile load carrying capability of ECC such that prestressing steel can be partially or completely removed from the design. As described herein, the removal of steel has several benefits including negation of possible steel corrosion, cost reduction, and reduced stiffness of the railroad tie. The ECC is tuned to a bending stiffness substantially lower than that of normal concrete and rubber crumb particles are used to implement the low stiffness rail-ECC. The technology utilizes a rail seat 12, made of high strength high ductility ECC to address the problem of induced deterioration of the tie under the rail, and a rail body 14. Several parameters are entered into the new rail design and include a minimum of 2% tensile ductility of the ECC, complete absence of ASR, high fatigue resistance of the ECC at least 5 times that of normal concrete, self-healing ability of the ECC that requires only water and air, customization of the ECC for lower stiffness in the tie (60% that of normal concrete), and higher abrasion resistance in the seat (three times that of normal concrete).

Self-Healing Engineered Cementitious Composites

Engineered cementitious composite (ECC) is a family of high performance fiber reinforced cement composites (HP-FRCC) that have been systematically tailored through the use of micromechanics to achieve high tensile ductility and tight crack widths. ECC has the ability to reach tensile strain capacities of 3-5% under loading, compared with 0.01-0.02% for traditional concrete, while maintaining tight crack widths of less than 60 µm. These tight crack widths are an intrinsic material property of ECC and do not depend on the amount of steel reinforcement or the size of a structure.

Because of the high ductility of ECC, an ECC slab can undergo extensive bending without fracture, similar to the behavior of a ductile metal. Due to this unusual behavior, ECC is also popularly known as "Bendable Concrete."

Since its first introduction by the present inventor, an extensive body of literature has been developed on the durability of ECC subject to various loading schemes and exposure environments. ECC has been demonstrated to remain damage tolerant with a high energy absorption capacity 17 times that of normal concrete under impact loading and exhibit fatigue life 2-3 orders of magnitude higher than normal concrete. In a side-by-side comparison test of a nine-inch deep beam subjected to 100,000 fatigue load cycles, the crack width in the standard R/C beam grew to 0.64 mm, whereas the crack width in the R/ECC beam remain below 0.05 mm throughout the test. ECC has been found to be substantially more durable than normal concrete when exposed to freezing and thawing environments, hot and wet cycles, and resists chloride penetration more effectively. In addition, ECC was found to have low ASR risk.

Most recently, research demonstrates that damaged ECC has the ability to robustly heal itself over time. Self-healing in ECC utilizes a combination of intrinsic reactions to form healing products, which fill and bind the faces of the microcracks of ECC when damage occurs. The continued hydration of unreacted cement, pozzolanic reactions, and carbonation produce calcium silicate hydrates (C—S—H) and calcium carbonate ($CaCO_3$), which have been found to be the two main healing products formed in ECC. It has been shown that the extent of self-healing is highly dependent on the crack width of a concrete material, with smaller cracks healing more completely and at a faster rate than larger cracks. Therefore, the tight crack widths of ECC promote robust self-healing behavior, which allows the damaged material to regain both permeability and mechanical properties.

Self-healing has proved to be extensive and reliable in ECC when specimens are allowed to heal under a controlled laboratory environment, as well as when healing is allowed to occur in the natural environment under random and sometimes extreme environmental conditions. The only requirement for ECC to repair itself is water (rain) and oxygen (air), both of which can be expected for railroad tie environment. This makes self-healing ECC ideal for field applications, including use in railroad infrastructure.

Material Solution

The replacement of concrete in railroad tie 10 by ECC mitigates many of the problems that lead to premature failure of current prestressed concrete railroad ties. The tensile ductility of ECC suppresses brittle fracture; the durability of ECC prevents the common deterioration mechanisms of normal concrete, while the self-healing functionality allows the ties to regain any loss of permeability and mechanical properties should damage occur.

Keeping in mind that the microstructure of ECC can be systematically tailored, the present teachings tune ECC to an optimal density and stiffness for railroad tie application, in order to maintain track stability while reducing tie weight and track vibration. Reducing the weight of railroad ties allows for easier installation, while facilitating transportation from the precast plant to the installation site, thus increasing sustainability since fewer fossil fuels are expended in the transportation of lightweight products. However, this consideration should be balanced with the functional need of the ties to stabilize the track rails.

One current disadvantage of concrete ties over timber ties is the excessively high stiffness, particularly when the ties are reinforced or prestressed with steel. Optimizing the stiffness of the tie would help reduce vibrations experienced on railroad track infrastructure, leading to smoother rides for cargo, passengers, and railroad workers. This is especially important for the health of railroad workers since exposure to vibration greatly increases their risk of developing serious neck and lower back disorders. The use of an ECC deliberately tuned to a Young's modulus closer to that of timber would contribute to overcoming these problems. Further, given the tensile ductility of ECC and its ability to control damage and self-heal microcracks, it may also be feasible to reduce or eliminate prestressing, which is mainly needed for reducing concrete cracking. If prestressing can be eliminated, this may reduce the overall cost of railroad ties since prestressing is a relatively expensive process and the price of steel is continuously rising. Removing prestressing steel further reduces the tie stiffness. As well, railroad tie deterioration associated with corrosion of prestressing steel cannot take place when it is not present.

Thus, the introduction of self-healing ECC leads to enhanced resiliency, durability, sustainability, ride-quality, and economics of railroad track infrastructure.

Goals, Objectives, and Expected Significance

Goal and Objectives

The present teachings seek to improve the performance of railroad infrastructure by translating previous research findings in self-healing ECC composites into durable railroad ties.

Intellectual Merit and Broader Impacts

In the United States, railroads provide nearly 180,000 jobs while supporting a wide range of industries, including manufacturing, agriculture, and technology. Therefore, the development of a self-healing ECC railroad tie has the potential to greatly impact society and the economy while furthering scientific knowledge and understanding in several fields.

The present teachings advance research and development in several areas, leading to the growth of scientific knowledge and understanding. In terms of civil engineering and materials development, tailoring ECC to the performance needs of the railroad industry illustrates how construction materials can be engineered for specific field applications. This type of materials development is important in order to ensure optimal infrastructure performance; however, it is not yet widely implemented in the field of civil engineering. In addition, the present teachings contribute to the growing field of self-healing concrete materials by studying self-healing functionality under impact and fatigue loadings, which are load types often experienced by railroad ties but have not been studied in relation to self-healing performance. The present teachings drive further research and development in the railroad industry by introducing a new material for tie design and construction.

Since the railroad industry provides thousands of jobs and supports local and national businesses, the present teachings greatly impact both society and the economy. The creation of a more durable and resilient railroad tie drastically reduces the amount of downtime caused by the need for frequent replacement of traditional ties, thus leading to more reliable railway transport. This benefits the economy by both maintaining and increasing connections between American businesses and U.S. markets, as well as markets throughout the world. The present teachings also increase partnerships between academia and the railroad industry through collaborations on the research, development, and testing of new tie materials and designs. In addition, if the use of self-healing ECC ties became widespread, precast concrete plants would likely need to expand to handle the extra product demand, thus creating jobs in the precast concrete industry.

Tuned ECC for Railroad Ties

The first step in the development of a self-healing ECC railroad tie 10 is the tailoring of ECC to the specific performance needs of the railroad industry. ECC can be tuned to achieve the optimal density and stiffness needed for application in this field. The density of ECC can be tuned using lightweight fillers, including air voids, glass bubbles, polymeric hollow bubbles, and lightweight aggregates of varying sizes. In addition, the stiffness of ECC has recently been tailored using recycled tire rubber. By combining the use of lightweight fillers and recycled tire rubber, ECC can be tuned to the optimal density and stiffness required for use in railroad ties.

The newly tuned mixture is then tested to ensure that it maintains the high tensile ductility, tight crack widths and self-healing properties characteristic of ECC materials. Uniaxial tension tests are performed to confirm the tensile ductility of the material and digital image correlation (DIC) can be used to monitor the number of cracks and crack widths during testing. Achieving a tensile ductility between 2-3% and crack widths less than 50 μm ensures adequate performance. Resonant frequency tests can be used to determine the rate of self-healing, while uniaxial reloading tests can determine the recovery of mechanical properties. Both resonant frequency and mechanical property recoveries should be greater than 90% after 10 laboratory healing cycles, where samples are submerged in water for 24 hours followed by 24 hours of drying in air. These levels of resonant frequency and mechanical property recovery have been found to ensure an adequate level of healing in the natural environment.

In order to further verify optimal performance in the railroad industry, abrasion resistance and performance of the tuned ECC under impact and fatigue loading can be completed. Abrasion resistance was verified in accordance with the ASTM C779 Revolving Disk Test, which tests resistance in the presence of an abrasive grit. This test most closely resembles the conditions that lead to rail seat deterioration of current prestressed concrete railroad ties in the field. Although ECC has proven to be extremely wear resistant under vehicular wheel loads, the intended use as a railroad tie is different in that the abrasion contact comes from the steel rail with much higher compressive force. In some embodiments, a very high strength (such as 150 MPa or above, or even over 200 MPa) and ductile ECC may be needed below the rail seat 12 for abrasion resistance.

Lastly, damage tolerance and self-healing functionality was verified under impact and flexural fatigue loading. Impact and fatigue loadings are the most common load types experienced by current railroad ties, so it is important that ECC performs well under these conditions. Damage tolerance under fatigue loading was evaluated using 4-point bending tests, while impact resistance was quantified using drop weight tests. The impact load magnitude and fatigue cyclic loading amplitudes and frequencies was representative of those experienced under railroad track conditions.

By way of non-limiting example, railroad tie 10 was successfully constructed having the following composition:
Cement (Type I or Type III): 500-700 kg/m3, Type III being used in applications where ties need to be removed from their molds less than 24 hours after casting;
Fly Ash (Class F or Class C): 600-800 kg/m3;
Fly Ash Cenospheres: 0-300 kg/m3, Fly ash cenospheres being used in applications where the density of the ties needs to be lowered (lowering the density will result in lighter ties that will be easier to transport);
Silica Fume: 0-100 kg/m3, silica fume being used in applications where the compressive and tensile strengths need to be increased from the minimum values shown herein;
Sand: 350-550 kg/m3;
Tire Rubber: 0-200 kg/m3, tire rubber being used in applications where the stiffness of the ties needs to be tailored to specific values (an example of this including tailoring an ECC tie to have the same stiffness as a wood tie to enable ECC ties to be dispersed with wood ties within track systems);
Water: 300-400 kg/m3;
Polymer Fiber (PVA, PE, PP, etc.): 1-3% by volume;
Superplasticizer: 5-30 kg/m3; and
Viscosity Modifying Admixture: 0-30 kg/m3.

In some embodiments, ECC railroad tie 10 can provide the following performance characteristics:
Compressive Strength: >50 MPa
First Cracking Tensile Strength: >3 MPa
Ultimate Tensile Strength: >5 MPa
Tensile Strain Capacity: >1%
Flexural Strength: >15 MPa
Crack Widths: <100 μm The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A railway tie comprising:
an elongated member comprising an elongated body and at least one rail seat portion that supports and contacts a railway rail, wherein the at least one rail seat portion is abrasion resistant and is made of a non-prestressed, self-healing engineered cementitious composite material, said material having a mixture of:
cement in the range of 500-700 kg/m$^3$,
fly ash in the range of 600-800 kg/m$^3$;
silica fume in the range of greater than 0 to 100 kg/m$^3$;
sand in the range of 350-550 kg/m$^3$;
water in the range of 300-400 kg/m$^3$;
polymer fiber in the range of 1-3% by volume;
superplasticizer in the range of 5-30 kg/m$^3$; and
viscosity modifying admixture in the range of greater than 0 to 30 kg/m$^3$, resulting in performance characteristics of at least:
compressive strength greater than 150 MPa;
first cracking tensile strength greater than 3 MPa;
ultimate tensile strength greater than 5 MPa;
tensile strain capacity greater than 2%;
flexural strength greater than 15 MPa; and
crack widths less than 100 μm.

2. The railway tie according to claim 1, further comprising: fly ash cenospheres in the range of 0-300 kg/m$^3$.

3. The railway tie according to claim 1, further comprising: tire rubber in the range of 0-200 kg/m$^3$.

4. The railway tie according to claim 1 wherein the cement is a Type I or Type III.

5. The railway tie according to claim 1 wherein the fly ash is a Class F or Class C.

6. The railway tie according to claim 1, further comprising fly ash cenospheres that reduce the density of the railway tie.

7. The railway tie according to claim 1 wherein the elongated body is absent of internal reinforcement members.

8. The railway tie according to claim 1 having a life span of at least 100 years.

9. A railway tie comprising:
an elongated member comprising an elongated body and at least one rail seat portion that supports and contacts a railway rail, wherein the elongated member is made of a non-prestressed, self-healing engineered cementitious composite material, said material having a mixture of:
cement in the range of 500-700 kg/m$^3$,
fly ash in the range of 600-800 kg/m$^3$;
silica fume in the range of greater than 0 to 100 kg/m$^3$;
sand in the range of 350-550 kg/m$^3$;
water in the range of 300-400 kg/m$^3$;
polymer fiber in the range of 1-3% by volume;
superplasticizer in the range of 5-30 kg/m$^3$; and
viscosity modifying admixture in the range of greater than 0 to 30 kg/m$^3$, wherein the at least one rail seat portion is abrasion resistant and has performance characteristics of:
compressive strength greater than 200 MPa;
first cracking tensile strength greater than 3 MPa;
ultimate tensile strength greater than 5 MPa;
tensile strain capacity greater than 2%;
flexural strength greater than 15 MPa; and
crack widths less than 100 μm,
wherein the elongated member is free of any internal reinforcement members.

\* \* \* \* \*